United States Patent [19]

Sigwart et al.

[11] Patent Number: 6,043,338
[45] Date of Patent: Mar. 28, 2000

[54] METHOD OF PRODUCING POLYOXYTETRAMETHYLENE GLYCOL

[75] Inventors: Christoph Sigwart, Schriesheim; Rolf Fischer, Heidelberg; Karsten Eller, Ludwigshafen; Rainer Becker, Bad Dürkheim; Klaus-Dieter Plitzko, Limburgerhof; Gerd Heilen, Neustadt, all of Germany

[73] Assignee: BASF Aktiengesellschaft, Ludwigshafen, Germany

[21] Appl. No.: 09/000,053

[22] PCT Filed: Jul. 26, 1996

[86] PCT No.: PCT/EP96/03297

§ 371 Date: Jan. 22, 1998

§ 102(e) Date: Jan. 22, 1998

[87] PCT Pub. No.: WO97/05188

PCT Pub. Date: Feb. 13, 1997

[30] Foreign Application Priority Data

Jul. 27, 1995 [DE] Germany ............... 19527532

[51] Int. Cl.⁷ .................................................. C08G 61/12
[52] U.S. Cl. ................ 528/405; 512/410; 512/411; 512/417
[58] Field of Search ................ 568/620, 623, 568/624; 528/405, 410, 417, 411

[56] References Cited

U.S. PATENT DOCUMENTS

| | | | |
|---|---|---|---|
| 2,499,725 | 3/1950 | Copelin | 260/496 |
| 3,358,042 | 12/1967 | Dunlop | 260/615 |
| 4,120,903 | 10/1978 | Pruckmayr et al. | 260/615 |
| 4,189,566 | 2/1980 | Mueller et al. | 528/408 |
| 4,243,799 | 1/1981 | Mueller et al. | 528/409 |
| 4,303,782 | 12/1981 | McHale et al. | 528/416 |
| 4,568,775 | 2/1986 | Aoshima et al. | 568/617 |
| 4,658,065 | 4/1987 | Aoshima et al. | 564/487 |
| 5,149,862 | 9/1992 | Dorai et al. | 560/240 |
| 5,641,857 | 6/1997 | Dostalek et al. | 528/361 |

FOREIGN PATENT DOCUMENTS

| | | |
|---|---|---|
| 003112 | 7/1979 | European Pat. Off. . |
| 2760272 | 3/1977 | Germany . |
| 4316138 | 5/1993 | Germany . |
| 58083028 | 11/1981 | Japan . |
| 248218 | 12/1969 | U.S.S.R. . |
| 1575529 | 9/1980 | United Kingdom . |
| 92/14773 | 9/1992 | WIPO . |
| 96/27626 | 9/1996 | WIPO . |

OTHER PUBLICATIONS

Angew. Chem., vol. 72, 1960, pp. 927–934.

*Primary Examiner*—Melvyn I. Marquis
*Assistant Examiner*—D. Aylward
*Attorney, Agent, or Firm*—Keil & Weinkauf

[57] ABSTRACT

In a process for the preparation of copolymers of tetrahydrofuran and but-2-yne-1,4-diol by catalytic polymerization of tetrahydrofuran, the polymerization is carried out over a heterogeneous acidic catalyst which has acid centers of acidity $pK_a < +2$ in a concentration of at least 0.005 mmol/g of catalyst, in the presence of but-2-yne-1,4-diol. In particular, for the preparation of polyoxytetramethylene glycol, the copolymers are reacted in the presence of hydrogen over a hydrogenation catalyst.

13 Claims, No Drawings

METHOD OF PRODUCING POLYOXYTETRAMETHYLENE GLYCOL

The present invention relates to a process for the preparation of copolymers of tetrahydrofuran (THF) and but-2-yne-1,4-diol by catalytic polymerization of THF. The present invention relates in particular to a process for the preparation of polyoxytetramethylene glycol. Polyoxytetramethylene glycol, also referred to as polytetrahydrofuran (PTHF), is produced worldwide and serves as an intermediate for the preparation of polyurethane, polyester and polyamide elastomers, for the preparation of which it is used as a diol component. The incorporation of PTHF into these polymers renders them soft and flexible, and PTHF is therefore also referred to as the soft segment component for these polymers.

The cationic polymerization of tetrahydrofuran (THF) with the aid of catalysts was described by Meerwein et al. (Angew. Chem. 72 (1960), 927). Either premolded catalysts are used here as catalysts, or the catalysts are produced in situ in the reaction mixture. This is done by producing oxonium ions in the reaction medium with the aid of strong Lewis acids, such as boron trifluoride, aluminum chloride, tin tetrachloride, antimony pentachloride, iron(III) chloride or phosphorus pentafluoride, or by means of strong Brönsted acids, such as perchloric acid, tetrafluoroboric acid, fluorosulfonic acid, chlorosulfonic acid, hexachlorostannic(IV) acid, iodic acid, hexachloroantimonic(V) acid or tetrachloroferric(III) acid, and with the aid of reactive compounds referred to as promoters, such as alkylene oxides, eg. ethylene oxide, propylene oxide, epichlorohydrin, orthoacid esters, acetals, α-haloethers, acetyl chloride, carboxylic anhydrides, thionyl chloride or phosphoryl chloride, said oxonium ions initiating the polymerization of the THF. From the large number of these catalyst systems, however, only a few have become industrially important, since some of them are highly corrosive and/or lead to discolored PTHF products in the preparation of PTHF, which only have limited use. Furthermore, many of these catalyst systems do not have the catalytic action in the true sense but have to be used in stoichiometric amounts, based on the macromolecule to be prepared, and are consumed during the polymerization.

U.S. Pat. No. 3,358,042 describes the preparation of PTHF using fluorosulfonic acid as the catalyst. A particular disadvantage of the use of halogen-containing catalyst compounds is that they lead to the formation of halogenated byproducts during the PTHF preparation, which byproducts are very difficult to separate from the pure PTHF and have an adverse effect on its properties.

In the preparation of PTHF in the presence of the stated promoters, these promoters are incorporated into the PTHF molecule so that the primary product of the THF polymerization is not PTHF but a PTHF derivative. For example, alkylene oxides are incorporated as comonomers into the polymer, with the result that THF/alkylene oxide copolymers having properties, in particular performance characteristics, which differ from those of PTHF are formed.

The use of carboxylic anhydrides as promoters results primarily in the formation of PTHF diesters, from which PTHF must be liberated in a further reaction, for example by hydrolysis or transesterification (cf. U.S. Pat. No. 2 499 725 and DE-A 27 60 272).

According to U.S. Pat. No. 5,149,862, sulfate-doped zirconium dioxide is used as an acidic heterogeneous polymerization catalyst which is insoluble in the reaction medium. In order to accelerate the polymerization, a mixture of acetic acid and acetic anhydride is added to the reaction medium, since the polymerization takes place only very slowly in the absence of these promoters and, for example, a conversion of only 6% is achieved during a period of 19 hours. This process results in the formation of PTHF diacetates, which then have to be converted into PTHF by hydrolysis or transesterification.

JP-A 83 028/1983 describes the polymerization of THF in the presence of an acyl halide or carboxylic anhydride, a heteropolyacid being used as the catalyst. PTHF diesters are likewise formed and have to be hydrolyzed to PTHF.

PTHF diesters are also formed in the polymerization of chemically pretreated THF with bleaching earth catalysts in the presence of carboxylic anhydrides, eg. acetic anhydride, according to EP-A-0 003 112. A principle disadvantage of this THF polymerization process is associated with the costs incurred for the use of acetic anhydride and its elimination from the PTHF derivative (methyl ester) formed as the primary product.

If, on the other hand, the THF polymerization is carried out using water as a telogen (chain-terminating substance), PTHF is formed directly. According to U.S. Pat. No. 4,120,903, PTHF can be prepared from THF and water with the aid of superacidic Nafion® ion exchange resins. The disadvantage of this process is the high molecular weight of the resulting PTHF, which is about 10,000 Dalton. Such high molecular weight PTHF is to date of no industrial importance.

U.S. Pat. No. 4,568,775 and U.S. Pat. No. 4,658,065 describe, respectively, a process for the preparation of PTHF and the copolymerization of THF with a polyol, heteropolyacids being used as catalysts. The heteropolyacids are soluble to a certain degree in the polymerization mixture and in the polymer and, since they cause discoloration of the PTHF product, must be removed therefrom by expensive technical measures-addition of a hydrocarbon for precipitating the heteropolyacid, removal of the precipitated heteropolyacid and removal of the added hydrocarbon.

In U.S. Pat. No. 4,303,782, zeolites are used for the preparation of PTHF. However, the THF polymers obtainable by this process have extremely high average molecular weights- $M_n$=250,000 to 500,000 Dalton—and could not be used for the abovementioned intended uses. Accordingly, this process too is of no industrial importance. A further serious disadvantage is of this process is the low space-time yield (for example 4% of PTHF in 24 hours), which is achieved with the zeolites used therein.

All of the abovementioned processes for the direct preparation of PTHF have, especially for PTHF in the molecular weight range of from 500 to 3500 Dalton, which is of industrial interest, the disadvantage of low space-time yields in heterogeneous catalysis or the disadvantage of expensive removal of the catalyst in homogeneous catalysis.

It is an object of the present invention to provide a process which makes it possible to obtain PTHF in high space-time yields, ie. with high selectivity in conjunction with high THF conversion, and with simple removal of the catalyst.

We have found that this object is achieved, surprisingly, by polymerizing tetrahydrofuran over a strongly acidic heterogeneous catalyst in the presence of but-2-yne-1,4-diol and then catalytically hydrogenating the polyoxytetramethylene glycols containing C—C triple bonds to give polyoxytetramethylene glycol. The course of the reaction can be described by the following equation, only one of the possible copolymers being indicated as a reaction product of the reaction of THF with but-2-yne-1,4-diol.

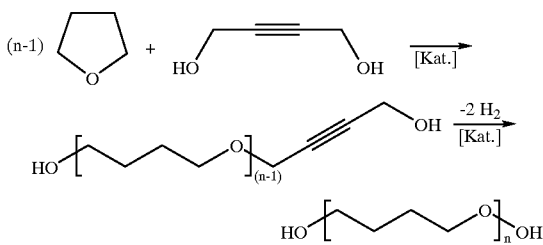

The present invention therefore relates to a process for the preparation of polyoxytetramethylene glycols or copolymers of THF and but-2-yne-1,4-diol by catalytic polymerization of THF, the polymerization being carried out over a heterogeneous acidic catalyst which has acid centers of acidity $pK_a < +2$ in a concentration of at least 0.005 mmol/g of catalyst, in the presence of but-2-yne-1,4-diol. The present invention relates in particular to a process for the preparation of polyoxy-tetramethylene glycol, the copolymers of THF and but-2-yne-1,4-diol or polyoxytetramethylene glycols, prepared according to the invention and containing triple bonds, being converted over a hydrogenation catalyst in the presence of hydrogen at from 20 to 300° C. and from 1 to 300 bar. Preferred embodiments of the invention are defined in the subclaims.

According to the invention, supported catalysts which comprise an oxide carrier, contain oxygen-containing molybdenum or tungsten compounds or mixtures of such compounds as catalytically active compounds and furthermore, if desired, may additionally be doped with sulfate or phosphate groups are preferably used as polymerization catalysts. For conversion into their catalytically active form, the supported catalysts are subjected to calcination at from 500 to 1000° C. after the precursor compounds of the catalytically active, oxygen-containing molybdenum and/or tungsten compounds have been applied to the carrier, the carrier and the precursor compound being converted into the catalysts which can be used according to the invention.

Suitable oxide carriers are, for example, zirconium dioxide, titanium dioxide, hafnium oxide, yttrium oxide, iron(III) oxide, alumina, tin(IV) oxide, silica, zinc oxide and mixtures of these oxides. Zirconium dioxide and/or titanium dioxide are particularly preferred.

The catalysts which may be used according to the invention contain in general from 0.1 to 50, preferably from 1 to 30, particularly preferably from 5 to 20, % by weight of the catalytically active, oxygen-containing compounds of molybdenum or of tungsten or of the mixtures of the catalytically active, oxygen-containing compounds of these metals, based in each case on the total weight of the catalyst, and, since the chemical structure of the catalytically active, oxygen-containing compounds of molybdenum and/or of tungsten is not known exactly to date but can only be postulated, for example from the data of the IR spectra of the catalysts which can be used according to the invention, it is calculated in each case as $MoO_3$ or $WO_3$.

In principle, in addition to containing the catalytically active, oxygen-containing molybdenum and/or tungsten compounds, the novel catalysts may also be doped with from 0.05 to 10, preferably from 0.1 to 5, in particular from 0.25 to 3, % by weight, based in each case on the total weight of the catalyst, of oxygen-containing sulfur- and/or phosphorus-containing compounds. Since the chemical form in which these sulfur- or phosphorus-containing compounds are present in the prepared catalyst is likewise unknown, the contents of these groups in the catalyst are calculated together as $SO_4$ or $PO_4$.

For the preparation of the novel catalysts, hydroxides of the relevant carrier components are as a rule used as starting materials. Where these hydroxides are commercially available, hydroxides obtainable on the market may be used as starting materials for the preparation of the oxide carriers, but preferably the oxide carriers are prepared using freshly precipitated hydroxides, which, after their precipitation, are generally dried at from 20 to 350° C., preferably from 50 to 150° C., in particular from 100 to 120° C., at atmospheric or reduced pressure.

In general, the water-soluble or hydrolyzable salts of the elements constituting the carrier, for example their halides, preferably their nitrates or carboxylates, in particular their acetates, are used as starting compounds for the preparation of these hydroxides. Suitable starting compounds for the pre-cipitation of these hydroxides are, for example, zirconyl chloride, zirconyl nitrate, titanyl chloride, titanyl nitrate, yttrium nitrate, yttrium acetate, aluminum nitrate, aluminum acetate, iron(III) nitrate, tin(IV) halides, in particular tin(IV) chloride, zinc nitrate or zinc acetate. The corresponding hydroxides are pre-cipitated from the solutions of these salts preferably by means of aqueous ammonia solution. Alternatively, the hydroxides can be obtained by adding dilute or weak acids, such as acetic acid, to water-soluble hydroxo complexes of the relevant metals until the relevant hydroxide is precipitated. It is also possible to obtain the hydroxides by hydrolysis of organometallic compounds, for example the alcoholates of the relevant metals, such as zirconium tetraethylate, zirconium tetraisopropylate, titanium tetramethylate, titanium tetraisopropylate, etc.

In general, a gelatinous precipitate is formed during the precipitation of these hydroxides, which precipitate gives an X-ray amorphous powder after drying. It is possible that these X-ray amorphous precipitates are composed not only of the hydroxides of the relevant metals but additionally of a large number of other hydroxyl-containing compounds, for example hydrated oxides, polymeric, water-insoluble hydroxo complexes, etc. However, since the exact chemical composition of these precipitates cannot be determined, for the purposes of this application it will be assumed for the sake of simplicity that they are the hydroxides of the stated metals. For the purposes of this application, the term hydroxides is thus an overall designation for the hydroxyl-containing precipitates obtained in the abovementioned pre-cipitation methods.

When silica is used as the oxide carrier, the starting material used for the preparation of the catalysts which can be used according to the invention is preferably freshly precipitated silica, which can be obtained, for example, by acidifying a waterglass solution, and which is advantageously dried before further processing, as described above for the hydroxide precipitates.

The precursor compounds of the catalytically active, oxygen-containing molybdenum and/or tungsten compounds are applied to the hydroxides of the carrier components or the silica, which are prepared in this manner and are also referred to as carrier precursors in this application, the application preferably being effected by impregnation with an aqueous solution of these pre-cursor compounds. For example, the water-soluble salts of tungstic acid ($H_2WO4$), as formed, for example, on dis-solution of tungsten trioxide in aqueous ammonia, ie. the monotungstates, and the iso-polytungstates formed therefrom on acidification, for example the paratungstates or metatungstates, and the water-soluble salts of molybdic acid ($H_2MoO_4$), as formed, for example, on dissolution of molybdenum trioxide in aqueous ammonia, and the isopolymolybdates formed therefrom on acidification, in particular the metamolybdates and paramolybdates, can be used as water-soluble precursor compounds of the catalytically active, oxygen-containing tungsten or molybdenum compounds. Preferably, the ammonium salts of these tungstic and molybdic acids are applied as pre-cursor compounds to the hydroxides of the carrier components or to the silica by impregnation. Regarding nomenclature, composition and preparation of the molybdates, isopolymolybdates, tungstates and isopolytungstates, reference may be made to Römpps Chemie-Lexikon, 8th edition, Volume 4, pages 2659–2660, Francksche Verlagsbuchhandlung, Stuttgart, 1985; Römpps Chemie-Lexikon, 8th edition, Volume 6, pages 4641–4644, Stuttgart 1988, and Comprehensive Inorganic Chemistry, 1st edition, Vol. 3, pages 738–741 and 766–768, Perganon Press, New York, 1973. Instead of the abovementioned molybdenum and tungsten precursor compounds of the catalytically active molybdenum and tungsten compounds, respectively, it is also possible to use heteropolyacids of molybdenum and of tungsten, such as 12-tungstatosilicic acid $(H_4[Si\{W_{12}O_{40}\}]26H_2O)$ or 12-molybdatosilicic acid, or their water-soluble salts, preferably their ammonium salts, for applying the molybdenum or tungsten to the hydroxide, ie. hydroxyl-containing, carrier precursor. The hydroxides of the particular carrier components used, which hydroxides have been impregnated in this manner, and the impregnated silica are generally dried at from 80 to 350° C., preferably from 90 to 150° C., at atmospheric or reduced pressure.

It is also possible to introduce the stated precursor compounds of the catalytically active, oxygen-containing molybdenum or tungsten compounds into the subsequently obtained catalyst by thorough mixing with one or more of the stated hydroxides. The calcination of the carrier precursors, which have been treated in this manner, to give the catalysts which can be used according to the invention is carried out in the same manner as for the carrier precursors impregnated with these precursor compounds. However, the impregnation method is preferably used for the preparation of the catalysts which can be used according to the invention.

The catalyst precursors impregnated and dried in this manner are converted into the finished catalysts by calcination in the air at from 500 to 1000° C., preferably from 550 to 900° C., particularly preferably from 600 to 800° C. In the course of the calcination, the hydroxides of the carrier components and the silica are converted into the oxide carrier, and the precursor compounds of the catalytically active, oxygen-containing molybdenum or tungsten compounds, which have been applied to said carrier by impregnation, are converted into the catalytically active components. Calcination at these high temperatures is critical for achieving a high conversion and hence a high space-time yield in the THF polymerization. At lower calcination temperatures, the catalysts also produce THF polymerization, but only with uneconomically low conversions. On the basis of IR investigations of catalysts prepared in this manner, Yinyan et al., Rare Metals 11 (1992), 185, presume that, in the case of tungsten-doped zirconium oxide supported catalysts, the precursor compound of the catalytically active, oxygen-containing tungsten compound, which precursor compound has been applied to the zirconium hydroxide by impregnation, forms a chemical bond with the hydroxyl groups of the carrier precursor at the high calcination temperatures used, resulting in the formation of the catalytically active, oxygen-containing tungsten compound, which differs substantially with regard to its chemical structure and chemical activity, in particular its catalytic properties, from oxygen-containing tungsten compounds merely adsorbed onto the zirconium dioxide carrier. This situation is also assumed for the molybdenum-containing supported catalysts which can be used according to the invention.

As stated above, supported catalysts which, apart from molybdenum and/or tungsten, are additionally doped with sulfur- and/or phosphorus-containing compounds may also advantageously be used in the novel process. These catalysts are prepared in a manner similar to that described above for the catalysts containing only molybdenum and/or tungsten compounds, sulfur- and/or phosphorus-containing compounds additionally being applied by impregnation to the hydroxides of the carrier components, prepared in a similar manner, or to the silica. The sulfur- and/or phosphorus compounds can be applied to the carrier simultaneously with the application of the molybdenum and/or tungsten component, or thereafter. The sulfur and/or phosphorus components are advantageously prepared by impregnating the hydroxides of the carrier components or the silica with an aqueous solution of a compound containing sulfate or phosphate groups, for example sulfuric acid or phosphoric acid. Solutions of water-soluble sulfates or phosphates may also advantageously be used for the impregnation, ammonium sulfates or ammonium phosphates being particularly preferred. A further method for applying the phosphorus-containing precursor compounds together with the molybdenum- or tungsten-containing precursor compounds to the hydroxide carrier precursor is to treat the hydroxide carrier precursors with phosphorus-containing heteropolyacids by the methods described above. Examples of such heteropolyacids are 12-tungstatophosphoric acid $(H_3PW_{12}O_{40} \cdot xH_2O)$ and 12-molybdatophosphoric acid $(H_3PMo_{12}O_{40} \cdot xH_2O)$. Heteropolyacids of molybdenum or of tungsten with organic acids of phosphorus, for example phosphonic acids, may also be used for this purpose. The stated heteropolyacids may also be used for this purpose in the form of their salts, preferably as ammonium salts.

During the calcination under the abovementioned conditions, the heteropolyacids are decomposed into the catalytically active, oxygen-containing molybdenum or tungsten compounds.

Some of the catalysts which can be used according to the invention are known, and their preparation is described, for example, in JP-A 288 339/1989, JP-A 293 375/1993, J. Chem. Soc., Chem. Commun. (1987), 1259, and Rare Metals 11 (1992), 185. The catalysts have been used to date predominantly only in petrochemical processes, for example as catalysts for alkylations, isomerizations and the cracking of hydrocarbons, ie. processes which are not related to the novel process.

In addition to the abovementioned tungsten- and molybdenum-containing zirconium dioxides, sulfate-doped zirconium dioxides may also be used as polymerization catalysts. The properties and the preparation of sulfate-doped zirconium dioxides are described, for example, in M. Hino and K. Arata, J. Chem. Soc., Chem. Comm. (1980), 851.

Bleaching earths, too, may be used as polymerization catalysts in the novel process. In mineralogical terms, bleaching earths or Fuller's earths belong to the montmorillonite class. These are hydrated aluminum hydrosilicates which occur naturally and in which some of the aluminum ions may have been replaced by iron, magnesium or other alkali metals or alkaline earth metals. The ratio of silica to oxides of divalent or trivalent metals in these minerals is in general 4:1. The commercial products, which are generally activated by acid treatment and have a water content of from 4 to 8% by weight, based on the total weight, are used in large amounts for refining edible oils, fats and mineral oils and as adsorbents and fillers.

Bleaching earths as obtainable under the name Tonsil® of the types K 10, KSF-O, KO and KS from Süd-Chemie AG, Munich, are particularly preferably used in the novel process.

Zeolites, too, may be used as polymerization catalysts in the novel process. Zeolites are defined as a class of aluminum silicates which, owing to their particular chemical structure, form three-dimensional networks having defined pores and channels in the crystal. Depending on their composition, in particular the $SiO_2$-$Al_2O_3$ molar ratio, and their crystal structure, which is determined not only by the stated atomic ratio but also by the method of preparation of the zeolites, a distinction is made between various zeolite types, some of whose names are attributable to naturally occurring zeolite minerals of similar composition and structure, for example the faujasites, mordenites or clinoptilolites, or which are assigned acronyms where there are no specific analogs in nature for the synthesized zeolites or where these zeolites form a structural subclass of the naturally occurring zeolites, for example the Y and X zeolites belonging to the faujasite type or the zeolites having a pentasil structure, such as ZSM-5, ZSM-11 or ZBM-10. Summaries of the chemical composition of the zeolites, their three-dimensional and chemical structure and their method of preparation appear in, for example, D. W. Breck, Zeolite Molecular Sieves, Wiley, New York, 1974.

The zeolites which are suitable for the novel process have an $SiO_2/Al_2O_3$ molar ratio of from 4:1 to 100:1, preferably from 6:1 to 90:1, particularly pre-ferably from 10:1 to 80:1. The primary crystallites of these zeolites have a particle size of up to 0.5 $\mu$m, preferably up to 0.1 $\mu$m, particularly preferably up to 0.05 $\mu$m.

The zeolites which may be used as polymerization catalysts in the novel process are employed in the H form. In this form, acidic OH groups are present in the zeolite. If the zeolites are not obtained in the H form in their preparation, they can be readily converted into the catalytically active H form, for example by treatment with, for example, mineral acids, such as hydrochloric acid, sulfuric acid or phosphoric acid, or by thermal treatment of suitable precursor zeolites which contain, for example, ammonium ions, for example by heating to 450–600° C., preferably 500–550° C.

All zeolites which meet the abovementioned requirements may be used as polymerization catalysts in the novel process. Examples of these are the zeolites of the mordenite group and those of the faujasite group, in particular the synthesized X and Y zeolites. Aluminophosphates or silicoaluminophosphates having a zeolite structure may also be used.

Zeolites having pentasil structure, for example ZSM-5, ZSM-11 and ZBM-10 zeolites, are particularly preferably used. Among these zeolites of the pentasil group, those which in turn have particularly advantageous properties are the zeolites which were prepared in such a way that they are substantially free of alkali metal compounds, ie. their alkali metal content is in general less than 50 ppm by weight. The preparation of alkali-free ZBM-10 zeolites is described in EP-A-0 007 081, and a method for the preparation of substantially alkali-free ZSM-5 zeolites is described by M üller et al. in Occelli, Robson (Eds.), Zeolite Synthesis, A. C. S. Symp. Series 398 (1989), 346. The zeolites prepared by these methods are present in the H form after a heat treatment at, for example, from 500 to 600° C.

In addition to zeolites, polymers containing $\alpha$-fluorosulfonic acid groups may also be used as polymerization catalysts. Perfluorinated polymers which contain $\alpha$-fluorosulfonic acid groups and are available, for example, under the name Nafion® from E.I. du Pont de Nemours and Company are preferred.

The catalysts which can be used according to the invention may be employed in the novel process in the form of powder, for example when the process is carried out by the suspension procedure, or advantageously as moldings, for example in the form of cylinders, spheres, rings, spirals or chips, particularly in a fixed-bed arrangement of the catalyst, which arrangement is preferred when, for example, loop reactors are used or the process is carried out by continuous methods.

In principle, any desired THF may be used as a monomer. Commercial THF or THF prepurified by acid treatment (cf. EP-A-0 003 112) or by distillation is preferably used.

According to the invention, but-2-yne-1,4diol is used as a telogen, ie. as a substance which effects chain termination in the polymerization reaction.

The telogen is fed to the polymerization advantageously as a solution in THF. Since the telogen stops the polymerization, the average molecular weight of the unsaturated PTHF copolymer can be controlled by means of the amount of telogen used. The larger the amount of telogen contained in the reaction mixture, the lower is the average molecular weight of the unsaturated PTHF copolymer. Depending on the telogen content of the polymerization mixture, the relevant PTHF copolymers having average molecular weights of from 250 to 10,000 can be prepared in a controlled manner. The novel process is preferably used for preparing the relevant PTHF copolymers having average molecular weights of from 500 to 5000, particularly preferably from 650 to 3500, Dalton. For this purpose, the telogen is added in amounts of from 0.04 to 17, preferably from 0.2 to 8, particularly preferably from 0.4 to 4, mol %, based on the amount of THF used.

The polymerization is carried out in general at from 0 to 100° C., preferably from 25° C. to the boiling point of the THF. The pressure used is as a rule not critical for the result of the polymerization, and the procedure is therefore generally carried out at atmospheric pressure or under the autogenous pressure of the polymerization system.

In order to avoid the formation of ether per-oxides, the polymerization is advantageously carried out under an inert gas atmosphere. The inert gases used may be, for example, nitrogen, hydrogen, carbon dioxide or the noble gases, nitrogen being preferably employed.

The polymerization stage of the novel process can be carried out batchwise or continuously, the continuous procedure generally being preferred for economic reasons.

In the batchwise procedure, the reactants THF and but-2-yne-1,4-diol and the catalyst are generally reacted in a stirred kettle or loop reactor at the stated temperatures until the desired conversion of the THF is reached. The reaction time may be from 0.5 to 40, preferably from 1 to 30, hours, depending on the amount of catalyst added. For the polymerization, the catalysts are added in general in an amount of from 1 to 90, preferably from 4 to 70, particularly preferably from 8 to 60, % by weight, based on the weight of the THF used.

For working up in the case of the batchwise procedure, the discharged reaction mixture is separated from the catalyst suspended therein, advantageously by filtration, decanting or centrifuging.

The discharged polymerization mixture freed from the catalyst is generally worked up by distillation, unconverted THF advantageously being distilled off in a first stage. In a second purification stage, low molecular weight PTHF can, if desired, then be separated from the polymer by distillation at reduced pressure and can be recycled to the reaction. Alternatively, volatile THF oligomers can be depolymerized, for example by the process of DE-A 30 42 960, and recycled to the reaction in this manner.

In a preferred embodiment of the invention, the conversion of the copolymers containing C—C triple bonds and comprising THF and but-2-yne-1,4-diol into PTHF is carried out by catalytic hydrogenation.

When carrying out the hydrogenation, the copolymers, containing C—C triple bonds, and hydrogen are reacted over a hydrogenation catalyst at in general from 1 to 300, preferably from 20 to 250, in particular from 40 to 200, bar and at from 20 to 300° C., preferably from 60 to 200° C., particularly preferably from 100 to 160° C., to give polyoxytetramethylene glycol.

The hydrogenation can be carried out without a solvent or, advantageously, in the presence of a solvent which is inert under the reaction conditions. Such solvents may be, for example, ethers, such as tetrahydrofuran, methyl tert-butyl ether or di-n-butyl ether, alcohols, such as methanol, ethanol, propanol, isopropanol, butanol, isobutanol or tert-butanol, hydrocarbons, such as n-hexane, n-heptane or n-octane, and N-alkyllactams, such as N-methylpyrrolidone or N-octylpyrrolidone. A preferred solvent is tetrahydrofuran. The reacted polymerization mixtures obtained after the polymerization catalyst has been separated off are particularly preferably hydrogenated.

In general, all catalysts which are suitable for hydrogenating C—C triple bonds may be used as hydrogenation catalysts in the novel process. Hydrogenation catalysts which dissolve in the reaction medium to give a homogeneous solution, as described, for example, in Houben-Weyl, Methoden der Organischen Chemie, Volume IV/lc, pages 16 to 26, may be used.

However, heterogeneous hydrogenation catalysts, ie. those hydrogenation catalysts which are essentially insoluble in the reaction medium, are preferably used in the novel process. In principle, virtually all hetero-geneous hydrogenation catalysts may be used for hydro-genating the C—C triple bonds of the copolymers to C—C single bonds. Among these hydrogenation catalysts, those which contain one or more elements of group Ib, VIIb and VIIb of the Periodic Table of Elements, in particular nickel, copper and/or palladium, are preferred.

In addition to these components and, if required, a carrier, these catalysts may contain one or more other elements, such as chromium, tungsten, molybdenum, manganese and/or rhenium. Depending on the preparation, oxidized phosphorus compounds, for example phosphates, may also be contained in the catalysts.

Heterogeneous hydrogenation catalysts which consist of metals in activated, finely divided form having a large surface area, for example Raney nickel, Raney copper or palladium sponge, may be used in the novel process.

For example, precipitated catalysts may also be used in the novel process. Such catalysts can be prepared by precipitating their catalytically active components from their salt solutions, in particular from the solutions of their nitrates and/or acetates, for example by adding alkali metal and/or alkaline earth metal hydroxide and/or carbonate solutions, as, for example, sparingly soluble hydroxides, hydrated oxides, basic salts or carbonates, then drying the precipitates obtained and thereafter converting them by calcination at in general from 300 to 700° C., in particular from 400 to 600° C., into the relevant oxides, mixed oxides and/or mixed-valency oxides, which are reduced by treatment with hydrogen or with a hydrogen-containing gas at, as a rule, from 100 to 700° C., in particular from 150 to 400° C., to the relevant metals and/or oxide compounds of lower oxidation state and are converted into the actual, catalytically active form. As a rule, reduction is continued until no more water is formed.

In the preparation of precipitated catalysts which contain a carrier, the precipitation of the catalytically active components may be effected in the presence of the relevant carrier. However, the catalytically active components can advantageously also be precipitated simultaneously with the carrier from the relevant salt solutions.

Furthermore, supported catalysts prepared in a conventional manner and containing one or more of the abovementioned catalytically active elements may also be used as heterogeneous hydrogenation catalysts in the novel process. Such supported catalysts are advantageously prepared by impregnating the carrier with a metal salt solution of the relevant elements, followed by drying and calcination at in general from 300 to 700° C., preferably from 400 to 600° C., and reduction in a hydrogen-containing gas stream. The impregnated carrier is generally dried at from 20 to 200° C., preferably from 50 to 150° C., at atmospheric or reduced pressure. Higher drying temperatures are also possible. The reduction of the catalytically active catalyst components is carried out in general under the conditions stated above for the precipitated catalysts.

In general, the oxides of the alkaline earth metals, of aluminum and of titanium, zirconium dioxide, silica, kieselguhr, silica gel, aluminas, silicates, such as magnesium or aluminum silicates, barium sulfate or active carbon may be used as carriers. Preferred carriers are zirconium dioxide, aluminas, silica and active carbon. It is of course also possible to use mixtures of different carriers as the carrier for catalysts which can be used in the novel process.

Hydrogenation catalysts which are preferably used in the novel process are Raney nickel, Raney copper, palladium sponge, impregnated supported catalysts, such as palladium on active carbon, palladium on alumina, palladium on silica, palladium on calcium oxide, palladium on barium sulfate, nickel on alumina, nickel on silica, nickel on zirconium dioxide, nickel on titanium dioxide, nickel on active carbon, copper on alumina, copper on silica, copper on zirconium dioxide, copper on titanium dioxide, copper on active carbon or nickel and copper on silica, and carrier-containing precipitated catalysts, such as Ni/Cu on zirconium dioxide, Ni/Cu on alumina or Ni/Cu on titanium dioxide.

Raney nickel, the abovementioned palladium supported catalysts, in particular palladium on alumina or palladium on a carrier comprising alumina and calcium oxide, and nickel and copper on precipitated catalysts containing a carrier, in particular nickel and copper on zirconium dioxide catalysts, are particularly preferably used in the novel hydrogenation process for the preparation of polytetrahydrofuran.

The palladium supported catalysts contain in general from 0.2 to 10, preferably from 0.5 to 5, % by weight, calculated as Pd and base d on the total weight of the catalyst, of palladium. The alumina/calcium oxide carrier for the palladium supported catalysts may contain in general up to 50, preferably up to 30, % by weight, based on the weight of the carrier, of calcium oxide.

Further preferred supported catalysts are nickel and copper on silica catalysts having a nickel content of in general from 5 to 40, preferably from 10 to 30, % by weight, calculated as NiO, a copper content of in general from 1 to 15, preferably from 5 to 10, % by weight, calculated as CuO, and an SiO2 content of in general from 10 to 90, preferably from 30 to 80, % by weight, based in each case on the total weight of the unreduced oxide catalyst. These catalysts may additionally contain from 0.1 to 5% by weight, calculated as $Mn_3O_4$, of manganese and from 0.1 to 5% by weight, calculated as $H_3PO_4$, of phosphorus, based in each case on the total weight of the unreduced oxide catalyst. Of course, the abovementioned contents of catalyst components sum to a total content of 100% by weight of these components in the catalyst. These catalysts are advantageously prepared by impregnating silica moldings with salt solutions of the catalytically active components, for example with solutions of their nitrates, acetates or sulfates, then drying the impregnated carriers at from 20 to 200° C., preferably from 100 to 150° C., under atmospheric or reduced pressure, calcining at from 400 to 600° C., preferably from 500 to 600° C., and reducing with hydrogen-containing gases. Such catalysts are disclosed, for example, in EP-A-295 435.

The precipitated catalysts comprising nickel and copper on zirconium dioxide may contain in general from 20 to 70, preferably from 40 to 60, % by weight, calculated as NiO, of nickel, in general from 5 to 40, preferably from 10 to 35, % by weight, calculated as CuO, of copper and in general from 25 to 45% by weight of zirconium dioxide, based in each case on the total weight of the unreduced oxide catalyst. In addition, these catalysts may contain from 0.1 to 5% by weight, calcula-ted as $MoO_3$ and based on the total weight of the unreduced oxide catalyst, of molybdenum. Such catalysts and their preparation are disclosed in U.S. Pat. No. 5,037,793, which is hereby incorporated by reference.

The precipitated catalysts as well as the supported catalysts can also be activated in situ in the reaction mixture by the hydrogen present there. In a preferred embodiment of the invention, however, the catalysts are reduced with hydrogen at from 20 to 300° C., preferably from 80 to 250° C., before being used.

The hydrogenation stage of the novel process may be carried out either continuously or batchwise. In the continuous procedure, it is possible to use, for example, tube reactors in which the catalyst is advantageously arranged in the form of a fixed bed over which the reaction mixture can be passed by the liquid phase or trickle-bed method. In the batchwise procedure, either simple stirred reactors or, advantageously, loop reactors may be used. When loop reactors are used, the catalyst is advantageously arranged in the form of a fixed bed. The hydrogenation in the novel process is preferably carried out in the liquid phase.

The hydrogenation product polytetrahydrofuran (PTHF) is generally isolated from the discharged hydrogenation mixture in a conventional manner, for example by distilling off the solvent contained in said hydrogenation mixture and any other low molecular weight compounds present.

The novel process gives polytetrahydrofuran having a very low color number in high space-time yields and with simple removal of the catalyst. At the same time, the polytetrahydrofuran prepared according to the invention has a molecular weight of from 500 to 3500, a range which is of industrial interest.

In a further embodiment of the invention, the C—C triple bonds of the copolymers of THF and but-2-yne-1,4-diol are converted into C—C double bonds by partial hydrogenation, resulting in a polymer which corresponds to a THF/but-2-yne-1,4-diol copolymer in its chemical structure. Such THF/but-2-yne-1,4-diol copolymers are used, for example, as diol components for the preparation of radiation-curable polyurethane and polyester finishes.

The catalysts stated above for the hydrogenation of the C—C triple bonds to C—C single bonds may be used for hydrogenating the C—C triple bonds to C—C double bonds, but in general it should be ensured that the amount of hydrogen used for the partial hydrogenation does not exceed the stoichiometric amount of hydrogen required for the partial hydrogenation of the C—C triple bonds to C—C double bonds.

The partial hydrogenation of the C—C triple bonds to C—C double bonds is preferably carried out using partially poisoned hydrogenation catalysts, for example Lindlar palladium, which can be prepared by impregnation of a carrier, eg. calcium carbonate, with a water-soluble palladium compound, eg. $Pd(NO_3)_2$, reduction of the applied palladium compound with, for example, hydrogen to give palladium metal and subsequent partial poisoning of the resulting palladium supported catalyst with a lead compound, eg. lead(II) acetate. Such Lindlar catalysts are commercially available.

Other preferred, partially poisoned palladium catalysts are the catalysts which are described in German Patent Application No. P 43 33 293.5 and which can be prepared by successive gas-phase deposition of first palladium and then lead and/or cadmium onto a woven metal wire fabric or a metal foil.

The partial hydrogenation of the C—C triple bonds of the tetrahydrofuran/but-2-yne-1,4-diol copolymers to C—C double bonds is carried out in general at from 0 to 100° C., preferably from 0 to 50° C., particularly preferably from 10 to 30° C., and at from I to 50, preferably from 1 to 5, in particular from 2 to 3, bar. The hydrogen is preferably used in the stoichiometric amount required for the partial hydrogenation of the C—C triple bonds. If it is not intended to hydrogenate all C—C triple bonds to double bonds, the hydrogen may also be introduced in an amount which is smaller than the stoichiometric amount. The hydrogenation can be carried out either batchwise, for example in stirred kettles using suspension catalysts, or continuously, for example in tube reactors with a fixed-bed catalyst.

The examples which follow illustrate the invention and constitute preferred embodiments of the invention.

Preparation of the catalysts

Catalyst A

Pulverulent bleaching earth K 10 (acid-treated montnorillonite from Süd-Chemie) which was additionally calcined for 2 hours at 350° C. was used as catalyst A.

Catalyst B

Bleaching earth K10 in powder form from Süd-Chemie was likewise used as starting material for catalyst B and was molded to give 2.5 mm extrudates and then calcined at 350° C.

Catalyst C

Catalyst C was prepared by adding 2600 g of zirconium hydroxide to 2260 g of a 26.5% strength by weight $MoO_3$ solution in 12% strength ammonia. This mixture was kneaded for 30 minutes and then dried for 16 hours at 120° C. The dried material was kneaded with 40 g of 75% strength phosphoric acid and 1.4 l of water for 30 minutes. Thereafter, drying was carried out for 2 hours at 120° C. The powder formed after sieving was pelletized and the resulting pellets were then calcined at 600° C. for 2 hours. The catalyst had a molybdenum content of 20% by weight, calculated as molybdenum trioxide, and a phos-phorus content of 1% by weight, calculated as $PO_4$, based on the total weight of the catalyst.

Catalyst D

Catalyst D was prepared by adding 2600 g of zirconium hydroxide to a solution of 640 g of tungstic acid ($H_2WO_4$) in 3470 g of 25% strength ammonia solution. This mixture was kneaded for 30 minutes and then dried for 2 hours at 120° C. The powder formed after sieving was pelletized and the resulting pellets (3×3 mm) were then calcined at 625° C. The catalyst had a tungsten content of 20% by weight, calculated as tungsten trioxide and based on the total weight of the catalyst.

Catalyst E

Catalyst E was prepared by adding 1600 g of zirconium hydroxide to a solution of 425 g of tungstic acid and 200 g of ammonium sulfate in 3470 g of 25% strength ammonia solution. This mixture was kneaded for 30 minutes and then dried for 2 hours at 120° C. The powder formed after sieving was pelletized and the resulting pellets were then calcined at 850° C. for 2 hours. The catalyst had a tungsten content of 18% by weight, calculated as tungsten trioxide, and a sulfur content of 7% by weight, calculated as $SO_4$, based on the total weight of the catalyst.

Catalyst F

Catalyst F was prepared by a preparation method due to M. Hino and K. Arata, J. Chem. Soc., Chem. Comm. (1980), 851, zirconium hydroxide being precipitated from an aqueous zirconyl nitrate solution by adding ammonia. The precipitated zirconium hydroxide was dried at 100° C., kneaded with 1N sulfluric acid and then molded to give 3×3 mm pellets. The pellets were dried at 100° C. and calcined at 550° C. for 2 hours. The catalyst had a sulfur content of 6% by weight, calculated as $SO_4$ and based on the total weight of the catalyst.

Determination of the acidity of the catalysts

The acidity of the catalysts A to F was determined as described by K. Tanabe in Catalysis: Science and Technology (eds. J. R. Anderson and M. Bondart), Springer-Verlag, Berlin, 1981, Vol. 2, Chapter 5, pages 235 et seq., by n-butylamine titration against the Hammet indicator 2-amino-5-azotoluene ($pK_a=+2.0$). The catalysts were dried beforehand at 200° C. and 0.01 mbar. The solvent used was benzene.

For the determination of its acidity, the parti-cular catalyst was suspended in benzene and titrated with n-butylamine in the presence of the indicator. The indicator is yellow in its basic form and changes its color to red (acidic form) as soon as it is adsorbed onto the surface of the catalyst. The titer of n-butylamine which is required to restore the yellow color of the indicator is a measure of the concentration of the acid centers of acidity $PK_a<+2$ in the catalyst, expressed in mmol/g of catalyst or milliequivalent (mval)/g of catalyst, and hence of its acidity.

Determination of the molecular weights

The average molecular weight ($M_n$) of the THF/butynediol copolymers and of the PTHF was determined by terminal group analysis by $^1H$-NMR spectroscopy. $M_n$ is defined by the equation in which $c_i$ is the concentration of the individual polymer species in the polymer blend obtained and in which $M_i$ is the molecular weight of the individual polymer species.

$$M_n = \Sigma c_i / \Sigma (c_i / M_i)$$

The THF/butynediol copolymers obtained by polymerization of THF in the presence of but-2-yne-1,4-diol show the following signals in the $^1H$-NMR spectrum (the chemical shift data relate to the signal maximum; solvent: $CDCl_3$): signal a: 4.3 ppm; b: 4.2 ppm; c: 3.6 ppm; d: 3.5 ppm, e: 3.4 ppm; f: 1.6 ppm.

As shown in the formula 1, these signals can be assigned to the protons indicated. The areas of the signals a, c and e were used for determining the molecular weight.

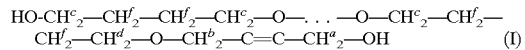

(I)

EXAMPLES

Batchwise THF polymerization in the presence of but-2yne-1,4-diol

Example 1

Catalyst A which had an acidity ($pK_a<+2$) of 0.17 mmol of acid centers/g of catalyst was used in this example.

10 g of catalyst A in powder form, which had been dried beforehand for 20 hours at 180° C./0.3 mbar to remove adsorbed water, were added to 20 g of peroxide-free THF which contained 1.6% by weight of but-2-yne-1,4-diol and 30 ppm by weight of water under an argon gas atmosphere in a 100 ml glass flask having a reflux condenser. The suspension was stirred for 20 hours at 50° C. After this time, the cooled reaction mixture was filtered and the catalyst powder was washed with three times 20 g of THF. The filtrates were combined and were evaporated down at 70° C./20 mbar in a rotary evaporator and then treated for 1 hour in a bulb tube at 150° C./0.3 mbar. 3.8 g of colorless THF/butynediol copolymer were obtained as distillation residue (yield: 19%, based on THF used). The copolymer had an average molecular weight $M_n$ of 1850.

Examples 2 to 6

Examples 2 to 6 were carried out as described in Example 1, the various catalysts B to F being used. The resulting average molecular weights $M_n$ of the THF/butynediol copolymers, the yields achieved and the acidities of the catalysts used, which were determined by Hammet titration, are listed in Table 1.

TABLE 1

| Example | Catalyst | Catalyst type | Acidity ($pK_a < +2$) [mmol/g of catalyst] | Copolymer yield [%] | $M_n$ ($^1H$-NMR) |
|---|---|---|---|---|---|
| 2 | B | Bleaching earth | 0.07 | 15.9 | 2500 |
| 3 | C | $MoO_3$—$ZrO_2$—$PO_4$ | 0.10 | 14.2 | 720 |
| 4 | D | $WO_3$—$ZrO_2$ | 0.12 | 13.2 | 1700 |
| 5 | E | $WO_3$—$ZrO_2$—$SO_4^{2-}$ | 0.12 | 18.0 | 1200 |
| 6 | F | $ZrO_2$—$SO_4^{2-}$ | 0.13 | 16.8 | 950 |

Batchwise THF polymerization in the presence of butane-1,4-diol

Comparative Example 1 (comparison with Example 4)

As described in Example 1, 20 g of THF which contained 0.15% by weight of butane-1,4diol and 30 ppm of water were heated at 50° C. for 20 hours with 10 g of catalyst D in the form of 3×3 mm pellets which had been dried beforehand for 20 hours at 180° C./0.3 mbar. After the catalyst had been removed and the filtrate evaporated down under reduced pressure as described in Example 1, a polymeric evaporation residue was obtained in a yield of only 4.1%, based on THF used. The molecular weight of the PTHF was 1700.

Continuous THF polymerization in the presence of but-2-yne-1,4-diol

Example 7

A 250 ml fixed-bed reactor was filled, under argon, with 352 g (250 ml) of the $ZrO_2/SO_4$ catalyst F dried for 24 hours at 180° C./0.3 mbar. The polymerization apparatus was filled with but-2-yne-1,4-diol-containing THF (1.5% by weight of but-2-yne-1,4-diol). This reaction mixture was first pumped over the catalyst for 24 hours at a reactor temperature of 50° C. Thereafter, further but-2-yne-1,4-diol-containing THF (1.5% by weight of but-2-yne-1,4-diol) was fed in continuously at a catalyst space velocity of 0.04 kg of THF per 1 of catalyst per h. The circulation/feed ratio was about 40 and the reactor temperature was 50° C. The discharged polymerization mixture (730 g) obtained during a run time of 72 hours was worked up. After unconverted THF had been distilled off and the residue obtained had then been subjected to molecular distillation at 150° C./0.3 mbar, the resulting distillation residue comprised 80 g of a THF/butynediol copolymer which, according to the $^1$H-NMR spectrum, had an average molecular weight $M_n$ of 970 Dalton. The average yield over the reaction time of 72 hours was 11%. A space-time yield of 4.4 g of THF/butynediol copolymer 970 per 1 of catalyst per h was obtained.

Continuous THF polymerization in the presence of butane-1,4-diol

Comparative Example 2 (comparison with Example 7)

A 250 ml fixed-bed reactor was filled, under argon, with 372 g (220 ml) of the $MoO_3$-$ZrO_2$ catalyst C dried for 24 hours at 180° C./0.3 mbar. The polymerization apparatus was filled with butane-1,4-diol-containing THF (0.4% by weight of butane-1,4-diol). This reaction mixture was first pumped over the catalyst for 24 hours at a reactor temperature of 50° C. Thereafter, further butane-1,4-diol-containing THF (0.4% by weight of butane-1,4-diol) was fed in continuously at a catalyst space velocity of 0.04 kg of THF per 1 of catalyst per h. The reacted polymerization mixture (725 g) obtained during a run time of 72 hours was worked up as described in Example 7, by distilling off the unconverted THF and carrying out molecular distillation. 49 g of PTHF which, according to $^1$H-NMR spectrum, had an average molecular weight $M_n$ of 980 Dalton were obtained. The yield was 6.8%. A space-time yield of only 2.5 g of PTHF 980 per 1 of catalyst per h was obtained.

Continuous THF polymerization in the presence of but-2-yne-1,4-diol

Example 8

A 250 ml fixed-bed reactor was filled, under argon, with 333 g (250 ml) of the $WO_3$-$Zro_2$ catalyst D dried for 24 hours at 180° C./0.3 mbar. The polymerization apparatus was filled with but-2-yne-1,4-diol-containing THF (0.9% by weight of but-2-yne-1,4-diol). This reaction mixture was first pumped over the catalyst for 24 hours at a reactor temperature of 50° C. Thereafter, further but-2-yne-1,4-diol-containing THF (0.9% by weight of but-2-yne-1,4-diol) was fed in continuously at a catalyst space velocity of 0.32 kg of THF per 1 of catalyst per h. The circulation/feed ratio was about 10 and the reactor temperature was 50° C. The discharged polymerization mixture (1.9 kg) obtained during a run time of 24 hours was worked up as described in Example 7, by distilling off the unconverted THF and carrying out molecular distillation. 185 g of a THF/butynediol copolymer which, according to $^1$H-NMR spectrum, had an average molecular weight $M_n$ of 2500 Dalton were obtained. The yield was 10%. A space-time yield of 32 g of THF/butynediol copolymer 2500 per 1 of catalyst per h was obtained.

Example 9

The continuous THF polymerization described in Example 8 and effected over the catalyst D was continued under otherwise identical reaction conditions with a feed which contained 2.0% by weight of but-2-yne-1,4-diol in THF, at a catalyst space velocity of 0.16 kg of THF per 1 of catalyst per h. After the THF conversion had stabilized, the discharged reaction mixture (2.9 kg) obtained during a run time of 72 hours was collected. After working up and molecular distillation as described in Example 7, 210 g of THF/butynediol copolymer were isolated, said copolymer having an average molecular weight $M_n$ of 1180 according to the $^1$H-NMR spectrum. The yield was 7% based on THF used. A space-time yield of 11 g of THF/butynediol copolymer 1180 per 1 of catalyst per h was obtained.

Example 10

The continuous THF polymerization described in Example 9 and effected over the catalyst D was continued under otherwise identical reaction conditions with a feed which contained 1.5% by weight of but-2-yne-1,4-diol in THF, at a catalyst space velocity of 0.16 kg of THF per 1 of catalyst per h. After the THF conversion had stabilized, the discharged reaction mixture (2.9 kg) obtained during a run time of 72 hours was collected. After working up and molecular distillation as described in Example 7, 280 g of THF/butynediol copolymer were isolated, said copolymer having an average molecular weight $M_n$ of 1620 according to the $^1$H-NMR spectrum. The yield was 10% based on THF used. A space-time yield of 16 g of THF/butynediol copolymer 1620 per 1 of catalyst per h was obtained.

As shown by the above examples, the novel process leads to a substantially higher space-time yield, in conjunction with higher THF conversions, than a conventional process in which the telogen used is butane-1,4diol instead of but-2-yne-1,4-diol.

HYDROGENATION EXAMPLES

Batchwise hydrogenation of THF/butynediol copolymers to PTHF

Example 11

In a 50 ml metal autoclave, 5 g of a THF/butynediol copolymer prepared similarly to Example 1, in 10 g of tetrahydrofuran, were hydrogenated with hydrogen using 2 g of Raney nickel at 100° C. and 40 bar for 6 hours. After the catalyst had been separated off and the solvent distilled off at reduced pressure, 4.8 g of residue were obtained. This residue was furthermore subjected to distillation in a bulb tube at 150° C./0.3 mbar. The distillation residue obtained was a colorless polytetrahydrofuran which, according to the $^1$H-NMR spectrum, contained no C—C triple bonds. The PTHF thus obtained had an average molecular weight $M_n$ of 1900.

Example 12

10 g of a THF/butynediol copolymer prepared similarly to Example 6 and dissolved in 10 g of tetrahydrofuran were hydrogenated with hydrogen using 4 g of a nickel- and copper-containing supported catalyst (prepared according to U.S. Pat. No. 5 037 793; nickel content 50%, calculated as NiO; copper content 17%, calculated as CuO; molybdenum content 2%, calculated as $MoO_3$; carrier: $ZrO_2$ 31% by weight; catalyst form: 6×3 mm pellets) at 120° C. and 40 bar for 6 hours. The catalyst had been activated beforehand in a stream of hydrogen at 200° C. for 2 hours. Working up and molecular distillation of the discharged hydrogenation mixture were carried out as described in Example 11. 9.2 g of colorless polytetrahydrofuran were obtained, which, according to the $^1$H-NMR spectrum, contained no C—C triple bonds and whose residual double bond content was <0.5%. The PTHF thus obtained had an average molecular weight $M_n$ of 1020.

Example 13

As described in Example 11, 10 g of a THF/butynediol copolymer prepared similarly to Example 2 and dissolved in 20 g of tetrahydrofuran were hydrogenated with hydrogen over 4 g of a calcium-containing palladium on alumina supported catalyst (prepared by impregnating an $Al_2O_3$/CaO carrier, obtained by kneading moist $Al_2O_3$ and CaO, drying at 120° C. and calcining at 550° C., with an aqueous palladium nitrate solution; palladium content 0.6% by weight, calculated as Pd; calcium content 20% by weight, calculated as CaO; 79.4% by weight of $Al_2O_3$) in the form of 4 mm extrudates at 120° C. and 40 bar for 8 hours. Working up and distillation were carried out as described in Example 11. 9.1 g of colorless PTHF which had an average molecular weight $M_n$ of 2600 were obtained. According to the $^1$H-NMR spectrum, the product contained no C—C triple bonds, and the residual content of C—C double bonds was <3%.

Example 14

As described in Example 11, 5 g of a THF/butynediol copolymer prepared similarly to Example 4, in 10 g of tetrahydrofuran, were hydrogenated with hydrogen using 2 g of a palladium on alumina catalyst (prepared by impregnating $Al_2O_3$ extrudates with an aqueous palladium nitrate solution, drying at 120° C. and calcining at 440° C.; palladium content 0.5% by weight, calculated as Pd; 99.5% by weight of $Al_2O_3$) in the form of 4 mm extrudates at 140° C. and 40 bar for 6 hours. The catalyst had been activated beforehand in a stream of hydrogen for 2 hours at 150° C. Working up and bulb-tube distillation of the discharged hydrogenation mixture were carried out as described in Example 11. 4.5 g of colorless PTHF were obtained, which, according to the $^1$H-NMR spectrum, contained no C—C triple bonds and had a residual double bond content of less than 2%. The molecular weight $M_n$ was 1750.

We claim:

1. A process for the preparation of copolymers of tetrahydrofuran and but-2-yne-1,4-diol by catalytic polymerization of tetrahydrofuran, which comprises carrying out the polymerization over a heterogeneous acidic polymerization catalyst which has acid centers of acidity $pK_a<+2$ in a concentration of at least 0.005 mmol/g of catalyst, in the presence of but-2-yne-1,4-diol, wherein the polymerization catalyst used is a member selected from the group consisting of:

a) a supported catalyst which contains a catalytically active amount of an oxygen-containing tungsten or molybdenum compound or a mixture of these compounds on an oxide carrier, b) a sulfate-doped zirconium dioxide, c) a bleaching earth, and d) a perfluorinated polymer containing α-fluorosulfonic acid groups.

2. A process as claimed in claim 1, wherein, in the case of the catalysts (a), calcination has been effected at from 500 to 1000° C. after application of the precursor compounds of the oxygen-containing molybdenum or tungsten compounds to the carrier precursor.

3. A process as claimed in claim 1, wherein the oxide carrier used is zirconium dioxide, titanium dioxide, hafnium oxide, yttrium oxide, iron oxide, alumina, tin oxide, silica, zinc oxide or a mixture of these oxides.

4. A process as claimed in claim 1, wherein the supported catalyst contains from 0.1 to 50% by weight, calculated as molybdenum trioxide or tungsten trioxide and based on the total weight of the catalyst, of molybdenum or tungsten.

5. A process as claimed in claim 1, wherein a catalyst which is additionally doped with oxygen-containing sulfur or phosphorus compounds is used.

6. A process as claimed in claim 1, wherein zirconium dioxide or titanium dioxide is used as the carrier.

7. A process as claimed in claim 1, wherein the but-2-yne-1,4-diol is used in an amount of from 0.04 to 17 mol%, based on tetrahydrofuran.

8. A process as claimed in claim 1, wherein the polymerization is carried out at from 0 to 100° C.

9. A process for the preparation of polyoxytetramethylene glycol, which comprises reacting a copolymer prepared by a process as claimed in claim 1 and comprising tetrahydrofuran and but-2-yne-1,4-diol, in the presence of hydrogen at from 20 to 300° C. and from 1 to 300 bar over a hydrogenation catalyst.

10. A process as claimed in claim 9, wherein a hydrogenation catalyst which contains at least one element from group Ib, VIIb or VIIIb of the Periodic Table of Elements is used.

11. A process as claimed in claim 9, wherein a hydrogenation catalyst which contains at least one of the elements nickel, copper and palladium is used.

12. A process as claimed in claim 9, wherein a heterogeneous hydrogenation catalyst is used.

13. A process for the preparation of copolymers of tetrahydrofuran and but-2-yne-1,4-diol, which copolymers contain double bonds, which comprises subjecting the copolymer prepared by a process as claimed in claim 1 and comprising tetrahydrofuran and but-2-yne-1,4-diol to partial hydrogenation over a hydrogenation catalyst.

* * * * *